United States Patent [19]

Crane

[11] Patent Number: 5,447,765
[45] Date of Patent: * Sep. 5, 1995

[54] HIGH-DAMPING RIB-STIFFENED COMPOSITE HOLLOW CYLINDER CORE CONFIGURATION

[75] Inventor: Roger M. Crane, Arnold, Md.

[73] Assignee: The United States of America as represented by the Secretary of the Navy, Washington, D.C.

[*] Notice: The portion of the term of this patent subsequent to Nov. 16, 2010 has been disclaimed.

[21] Appl. No.: 237,533

[22] Filed: May 3, 1994

Related U.S. Application Data

[60] Continuation-in-part of Ser. No. 128,785, Sep. 30, 1993, Pat. No. 5,348,052, which is a division of Ser. No. 836,895, Feb. 19, 1992, Pat. No. 5,261,616.

[51] Int. Cl.$^6$ .......................... B21F 17/00; B65C 3/16; B29D 23/00; B32B 1/08
[52] U.S. Cl. .................. 428/36.9; 428/36.91; 242/7.21; 242/7.22; 242/7.23
[58] Field of Search ............... 242/7.21, 7.22, 7.23; 156/446; 428/36.9, 36.91

[56] References Cited

U.S. PATENT DOCUMENTS 4,954,377  9/1990  Fischer et al. .................. 428/36.1
5,108,262  4/1992  Crane .................................. 416/230
5,261,616 11/1993  Crane et al. ...................... 242/7.22

Primary Examiner—George F. Lesmes
Assistant Examiner—Kathryne E. Shelborne
Attorney, Agent, or Firm—Howard Kaiser

[57] ABSTRACT

A multiple-layered, translatedly rib-stiffened, composite hollow cylinder and method for fabrication thereof utilizing filament winding technique known in the art. Selective utilization of high strain-to-failure viscoelastic matrix material, without resort to secondary processing, results in improved damping characteristics in terms of dissipation of mechanical and acoustic-energy as well as improved structural characterics in terms of damage tolerance.

11 Claims, 6 Drawing Sheets

HIGH-DAMPING RIB-STIFFENED COMPOSITE HOLLOW CYLINDER CORE CONFIGURATION

The invention described herein may be manufactured and used by or for the Government of the United States of America for governmental purposes without the payment of any royalties thereon or therefor.

This application is a continuation-in-part of Ser. No. 128,785, U.S. Pat. No. 5,348,052, filed 30 Sep. 1993 and issued 20 Sep. 1994 incorporated herein by reference, which is a division of Ser. No. 836,895, now U.S. Pat. No. 5,261,616, filed 19 Feb. 1992 and issued 16 Nov. 1993, incorporated herein by reference.

BACKGROUND OF THE INVENTION

The present invention relates to composite core configurations, more particularly to those which are rib-stiffened composite hollow cylindrical configurations and which are high-damping in furtherance of dissipation of mechanical vibration and acoustic energy.

Composite materials are seeing increased usage in structural applications. Composite materials have inherent damping properties which manifest themselves when utilized as constituent materials in various applications. Accordingly, composite materials have been considered by the U.S. Navy for numerous structural applications wherein dissipation of mechanical and acoustic energy is required, e.g., underwater applications utilizing structures such as torpedo hull bodies, UUV hulls and submarine structures. For such applications, optimization of damping performance is desired in addition to necessary structural performance.

For many such applications, the damping requirements are sufficiently high that modification to the structural configuration is required, normally in conjunction with utilization of parasitic damping material. However, configurational modification is frequently undesirable in terms of time, labor and cost-effectiveness as well as the possibility that a given modification would compromise damage tolerance and other performance aspects. Moreover, parasitic damping treatment can undesirably increase weight or bring about debonding or other degradation which is counterproductive to damage tolerance or damping performance.

SUMMARY OF THE INVENTION

It is therefore a principal object of the present invention to provide a core configuration which meets structural requirements and at the same time has improved damping characteristics in terms of mechanical energy dissipation and acoustic energy dissipation.

It is a further object of this invention to provide a more efficient method of fabricating such a core configuration.

Various core configurations have received consideration by the U.S. Navy. The double hollow core design taught by Roger M. Crane and D. Michael Bergen in U.S. Pat. No. 5,261,616 (entitled "Multi-Layered Translated Rib-Stiffened Composite Hollow Cylinder Assembly"), previously incorporated herein by reference, has demonstrated great promise not only in meeting the structural requirements of hydrostatically loaded cylinders but also in meeting the damping requirements. In tests conducted by the U.S. Navy in its Advanced Torpedo Technology Thrust Program, the Crane-Bergen double hollow core design performed significantly better than other cylinders tested when treated with high-strain-to-failure-material, polyurethane, as the parasitic damping material.

Crane and Bergen U.S. Pat. No. 5,261,616 disclose a multiple-layered, translatedly rib-stiffened, composite hollow cylinder and a method for fabrication thereof which utilizes filament winding techniques known in the art. The multiple composite translated rib-stiffened cylinder with hollow core is a superior enclosure in terms of mechanical vibrational energy dissipation, directionally controllable thermal energy transmission, and structural damage tolerance. Moreover, it advantageously permits a continuous fabrication procedure.

According to Crane and Bergen U.S. Pat. No. 5,261,616, an inner skin is wound over a mandrel. Then, circumferential ribs are wound over the inner skin, pin rings are placed at the axial ends of the mandrel, longitudinal stringers are engaged with the pin rings and wound over the circumferential ribs, circumferential bands are wound near the axial ends over the longitudinal stringers, and another skin is wound over the circumferential bands and longitudinal stringers. These steps, commencing with the winding of circumferential ribs and concluding with the winding of an additional skin, are repeated as many times as desired, each repetition forming an additional layer, with the circumferential ribs for each additional layer being longitudinally staggered in relation to the circumferential ribs for the previous layer.

Filament winding is a technique which is known in the art for the manufacture of cylindrical structures (e.g., tubes and pipes), spherical structures, and other surfaces of revolution. Typically, the filament winding process involves utilization of a resin bath through which dry fibers are passed and then wound; this type of filament winding is known as "wet winding." In this technique the wind angle, band width and tow tension are controlled. Alternatively, the filament winding process typically utilizes prepreg tape in favor of wet filament winding technique in order to achieve tighter control on fabricated properties.

The multiple-rib cylinder assembly disclosed by Crane and Bergen U.S. Pat. No. 5,261,616 features a multiple-layer rib-stiffener configuration. Manufacture of various types of composite structures having ribs or stiffeners has been known in the art prior to Crane and Bergen U.S. Pat. No. 5,261,616. In the manufacturing process for rib-stiffened flat structures, what has generally been involved is the separate manufacture of the ribs and of the face sheets, followed by secondary bonding. A rib-stiffened configuration has also been considered for cylindrical applications. Prior to Crane and Bergen U.S. Pat. No. 5,261,616, a typical approach for achieving a rib-stiffened cylindrical design has involved first winding ribs onto a mandrel which has rib grooves machined in it. After the ribs are wound or fabricated, the rest of the cylindrical form is wound. The mandrel, which is typically sectional, is then disassembled and the cylinder is removed.

For some applications, the core configuration according to Crane and Bergen U.S. Pat. No. 5,261,616, when utilizing only conventional matrix material such as epoxy resin as the filament winding matrix material, yields limited or insufficient increased damping; in such cases, this core configuration achieves significant levels of damping only through the incorporation of the parasitic damping treatment in the hollows.

The core configuration according to the present invention, on the other hand, features utilization of high strain-to-failure viscoelastic material as the filament winding matrix material for at least a portion of the core configuration, thereby obviating the need for add-on parasitic damping treatment or configurational modification in order to achieve desired levels of damping. The present invention's core configuration incorporates no add-on damping treatment; hence, the fabrication process therefor requires no additional steps for damping purposes, and deleterious consequences (e.g., structural degradation or weight increase) of parasitic damping treatment or configurational modification are avoided.

Moreover, the core configuration according to the present invention possesses energy-dissipating characteristics which are significantly greater than those of any other cylinder known to the inventor, even if such other cylinder has the benefit of the incorporation of parasitic damping material. The damping performances obtained by the U.S. Navy with the present core configuration were significantly enhanced in comparison with those obtained with the core configuration of Crane and Bergen U.S. Pat. No. 5,261,616 utilizing only conventional epoxy resin as the filament winding matrix material and incorporating add-on parasitic damping treatment.

The present invention amplifies the teaching of Crane and Bergen U.S. Pat. No. 5,261,616 only in the respect that a high strain-to-failure viscoelastic material (e.g., polyurethane or polyurthane/urea) is utilized instead of a conventional epoxy material as the matrix material which combines with fiber reinforcement material for purposes of winding at least a portion of the hollow cylinder; for many embodiments of this invention the high strain-to-failure viscoelastic material is utilized instead of conventional epoxy resin for purposes of winding at least one circumferential rib. The present invention provides a core configuration which is otherwise identical to that taught by Crane and Bergen U.S. Pat. No. 5,261,616; the ribs are identically located and the material systems for the shells and the fabrication methodology are otherwise the same.

Fischer and Crane U.S. Pat. No. No. 4,954,377, incorporated herein by reference, and Crane U.S. Pat. No. No. 5,108,262, incorporated herein by reference, disclose utilization of high strain-to-failure viscoelastic matrix material instead of a conventional matrix material as the matrix material which combines with multidimensionally braided fiber reinforcement material for purposes of making their respective structures.

Similarly, the present invention utilizes a high strain-to-failure viscoelastic matrix material (such as polyurethane or polyurethane/urea) instead of a conventional matrix material (such as epoxy) as the matrix material which combines with fibrous material for purposes of making at least a portion or portions of the high-damping, rib-stiffened composite hollow cylinder core configuration; a bath containing high strain-to-failure viscoelastic matrix material is prepared and the fibrous material is wet wound through the bath.

Other objects, advantages and features of this invention will become apparent from the following detailed description of the invention when considered with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Cylindrical workpiece 18, shown in various stages of completion in FIG. 1 through FIG. 8, is outward of and coaxial with mandrel 20.

Figure 1:
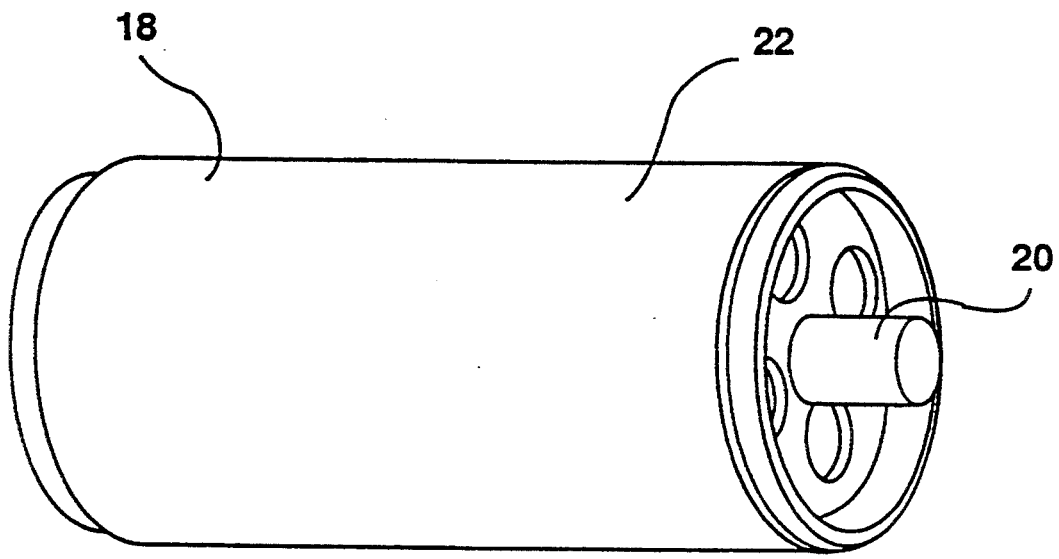
FIG. 1 through FIG. 8 are schematic perspective views representing the steps of the fabrication methodology of the present invention.

Referring now to FIG. 1, inner skin 22 is made of fibrous material. Unidirectional fibers are wound around cylindrical mandrel 20 to form a continuous skin, inner skin 22. Inner skin 22 of cylinder workpiece 18 has an outer surface defining a cylindrical shape which is coaxial with mandrel 20.

As taught by Crane and Bergen U.S. Pat. No. 5,261,616, the term "fibrous" material as used herein is fiber, filament or tape of any appropriate material composition. By way of elaboration, the filament winding art has conventionally utilized, for structural applications, fibers having appropriate strength characteristics (e.g., glass or carbon fibers) in conjunction with a conventional (e.g., epoxy) resin matrix. The ordinarily skilled artisan is well acquainted with the kinds and characteristics of fiber reinforcing materials which are conventionally or appropriately used for various structural applications. For example, glass fibers, generally speaking, are more flexible and less expensive than carbon fibers. In accordance with the present invention, the fibrous material can be but is not limited to fibrous material in any combination among any of the following categories thereof, well known to the ordinarily skilled artisan: glass fiber; carbon fiber (e.g., graphite fiber); polymer-based fiber (e.g., that which is sold under the trade names kevlar and spectra, kevlar being an aramid); quartz fiber; ceramic fiber (e.g., silicon carbide fiber); metallic fiber (e.g., aluminum fiber). Natural fibers such as silk or cotton or polymer-based fibers such as nylon or rayon are not conventionally used as fiber reinforcing material for structural applications; nevertheless, any fibrous material known to man can be used in accordance with the present invention, so long as that fibrous material is appropriate for a given structural application.

Figure 2:
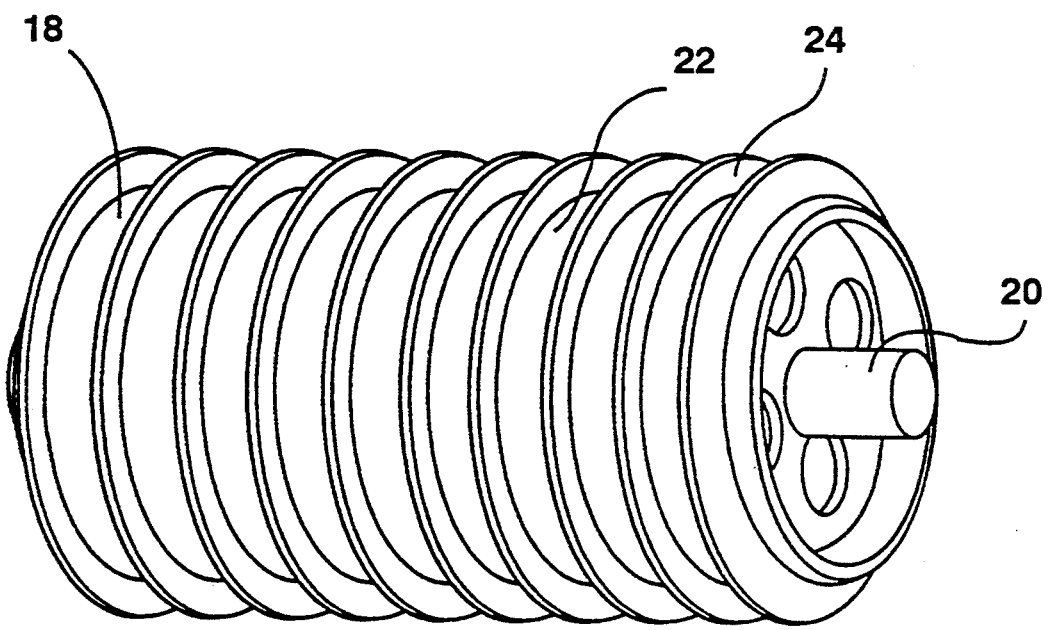

With reference to FIG. 2, after inner skin 22 of appropriate thickness is wound, inner circumferential ribs 24 running circumferentially around inner skin 22 are wound, using a filament-winding or tape-laying machine. A second fibrous material is wound circumferentially around the cylindrical shape defined by the other surface of inner skin 22 so as to form a plurality of inner circumferential ribs 24 spaced apart axially and having equiradial outer surfaces defining a cylindrical shape which is coaxial with mandrel 20.

FIG. 2 schematically illustrates inner circumferential ribs 24 wound over inner skin 22. Inner circumferential ribs 24 can be wound with or without the use of a dissolvable or sectional mold which is placed outside inner skin 22. If a dissolvable or sectional mold is utilized, this is removed after winding inner circumferential ribs 24.

In accordance with a preferred embodiment of the present invention, inner circumferential ribs 24 are wound by means of using a heated bath to wet wind fibrous material such as fiberglass with high strain-to-failure viscoelastic matrix material such as polyurethane or polyurethane/urea.

Figure 3:
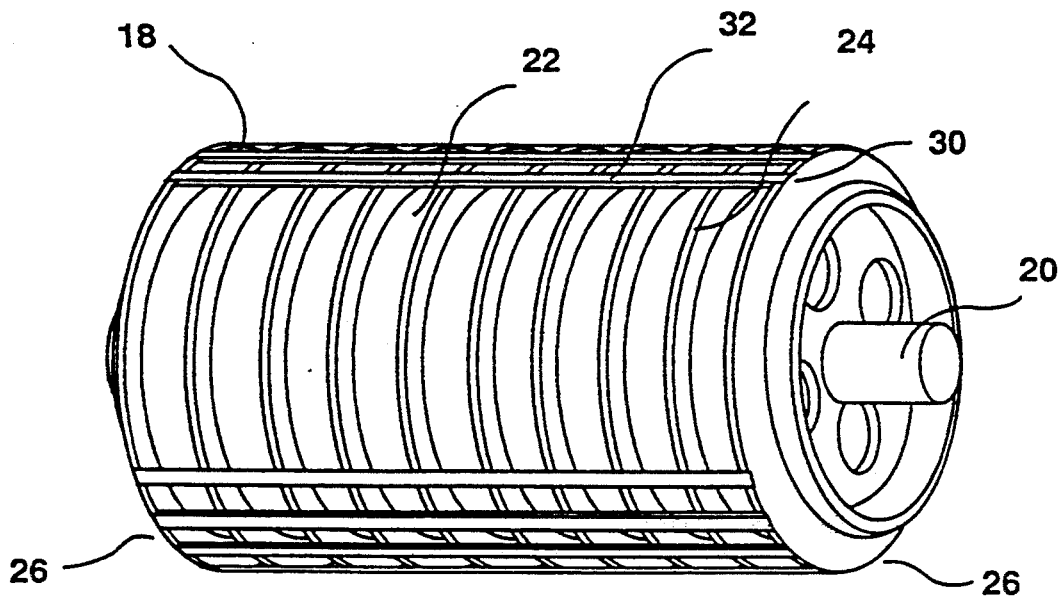
Figure 10:
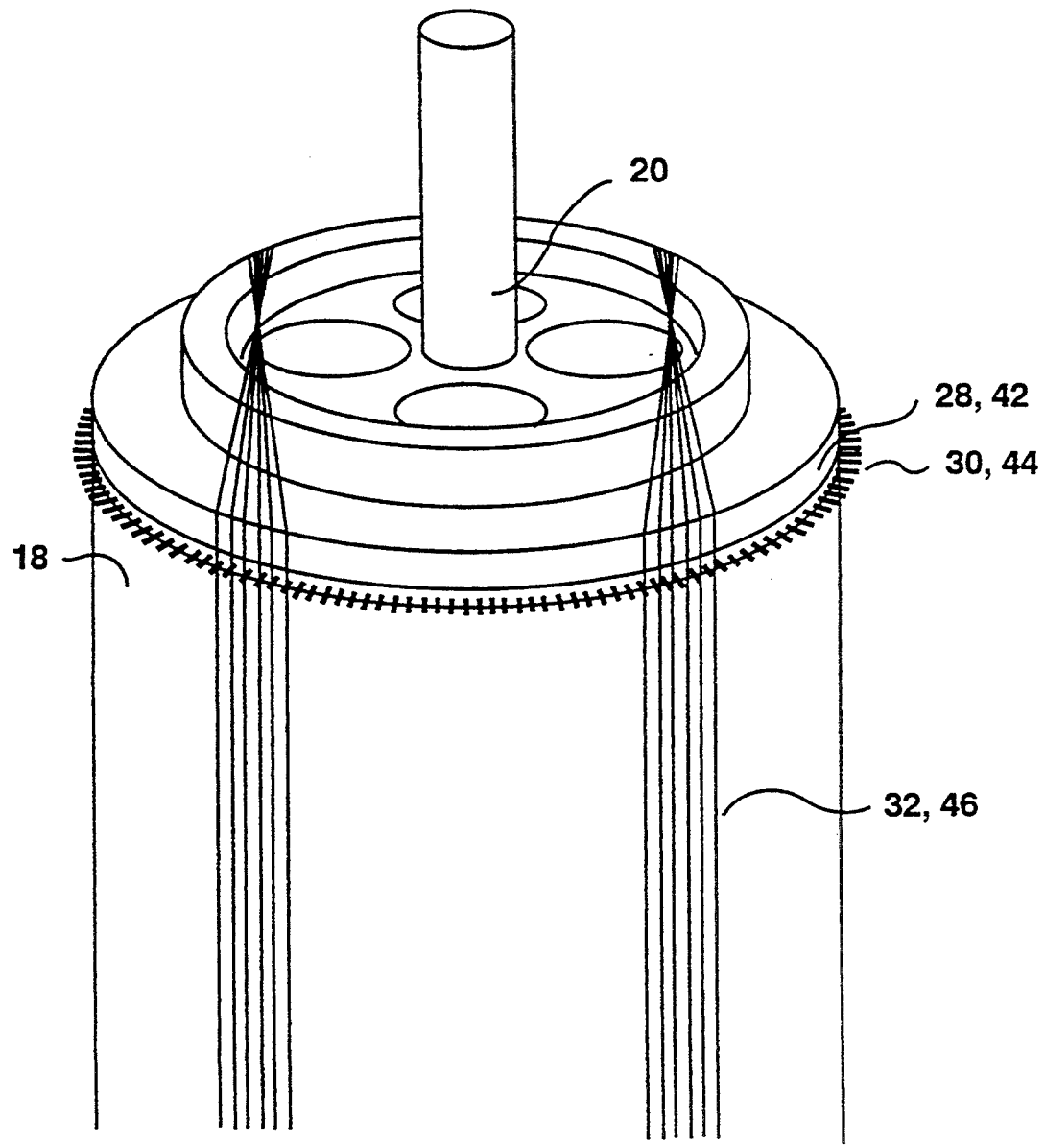
FIG. 10 is a diagrammatic partial perspective detail view of the mandrel and pin ring shown in FIG. 1.

Referring to FIG. 3, two inner pin rings 26 are positioned, one at each axial end of mandrel 20. Each inner pin ring 26 has an inner ring 28 portion and a plurality of inner pins 30 spaced part circumferentially and projecting radially from inner ring 28, as shown in FIG. 10. Each inner ring 28 has an outer surface defining a cylindrical shape which is coaxial with mandrel 20 and approximately equiradial with the cylindrical shape defined by said outer surfaces of inner circumferential ribs 24.

A third fibrous material is engaged with inner pins 30 and wound longitudinally along the cylindrical shape defined by the outer surfaces of inner circumferential ribs 24 so as to form a plurality of inner longitudinal stringers 32 which are spaced apart circumferentially and correspondingly with inner pins 30 and have equiradial outer surfaces defining a cylindrical shape which is coaxial with mandrel 20.

Figure 4:
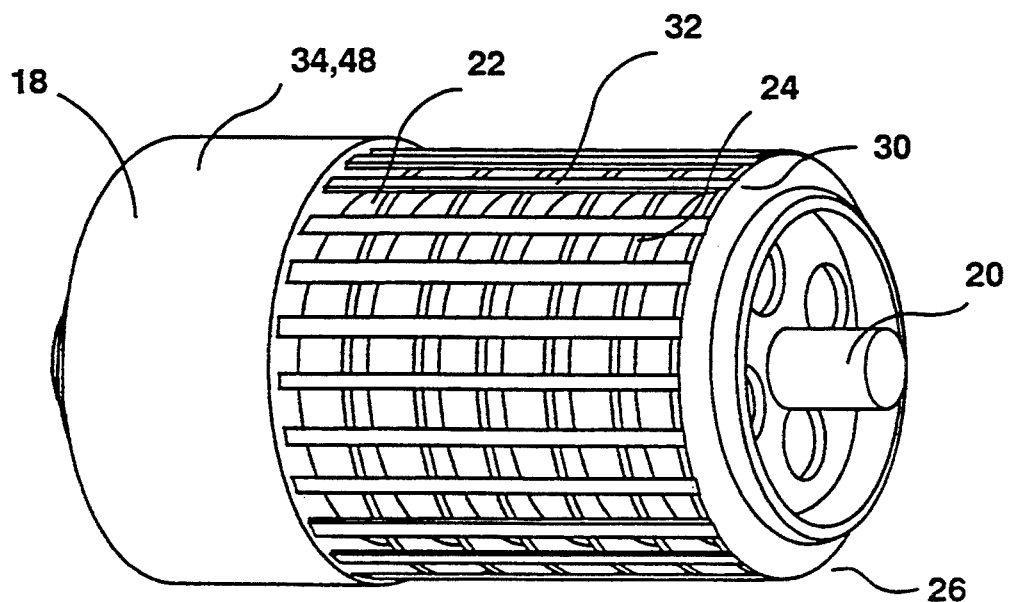

Reference now being made to FIG. 4, a fourth fibrous material is wound circumferentially around the cylindrical shape defined by the outer surfaces of inner longitudinal stringers 32 so as to form a pair of inner circumferential bands 34 (one inner circumferential band 34 shown) located longitudinally inward of and adjacent to inner pin rings 26, inner circumferential bands 34 being spaced part longitudinally and having equiradial outer surfaces defining a cylindrical shape which is coaxial with mandrel 20. Tapes or fibers are wound in the hoop direction at the ends of cylinder workpiece 18 to form inner circumferential bands 34, which provide a net force on inner longitudinal stringers 32 in the radial direction toward the interior of the cylinder.

Figure 5:
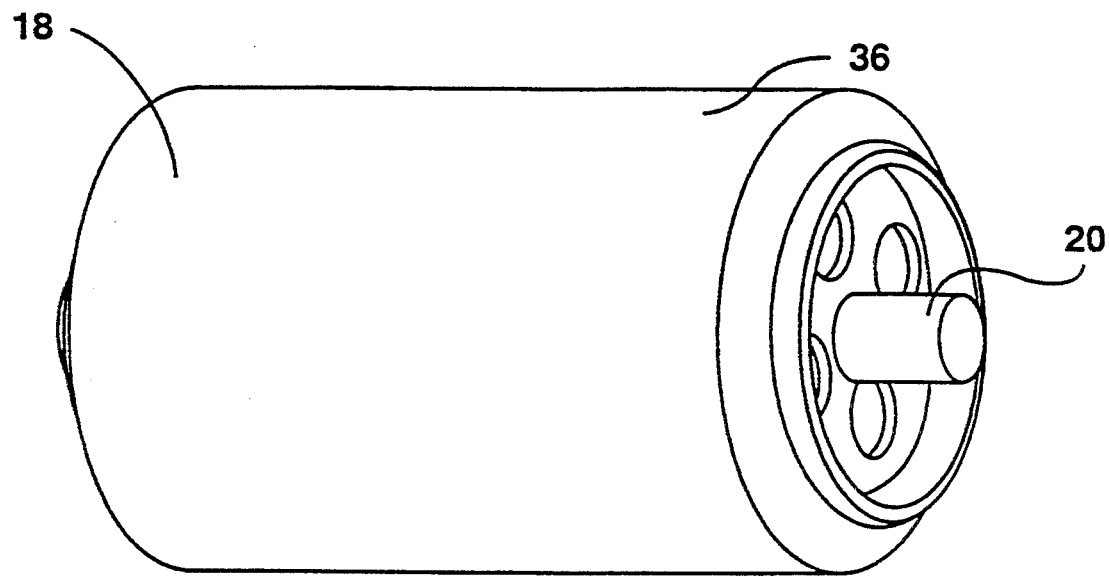

Another continuous skin is wound over top inner longitudinal stringers 32 and inner circumferential bands 34, referring now to FIG. 5. Here, a fifth fibrous material is wound circumferentially around the cylindrical shape defined by the outer surfaces of inner longitudinal stringers 32 and inner circumferential bands 34 so as to form intermediate skin 36 having an outer surface defining a cylindrical shape which is coaxial with mandrel 20.

At this point, referring to FIG. 5, cylinder workpiece 18 comprises inner skin 22, a plurality of inner circumferential ribs 24, a pair of inner pin rings 26, a plurality of inner longitudinal stringers 32, a pair of inner circumferential bands 34, and intermediate skin 36. In order to add another ribbed layer to cylinder workpiece 18, steps pertaining to circumferential winding of ribs, positioning of pin rings, longitudinal winding of longitudinal stringers, circumferential winding of bands, and circumferential winding of a skin, are essentially repeated.

Figure 6:
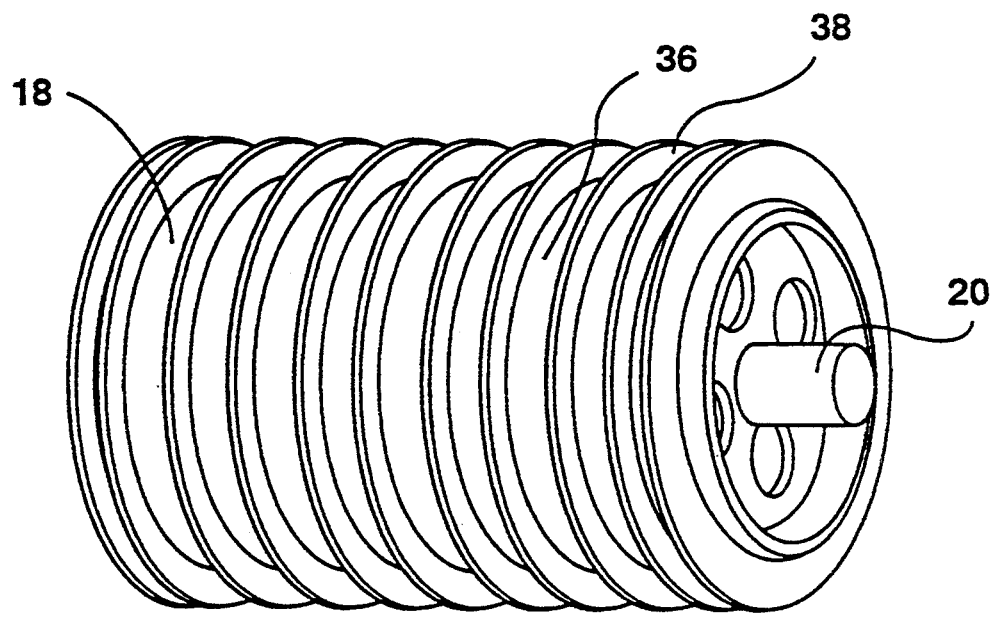
Figure 9:
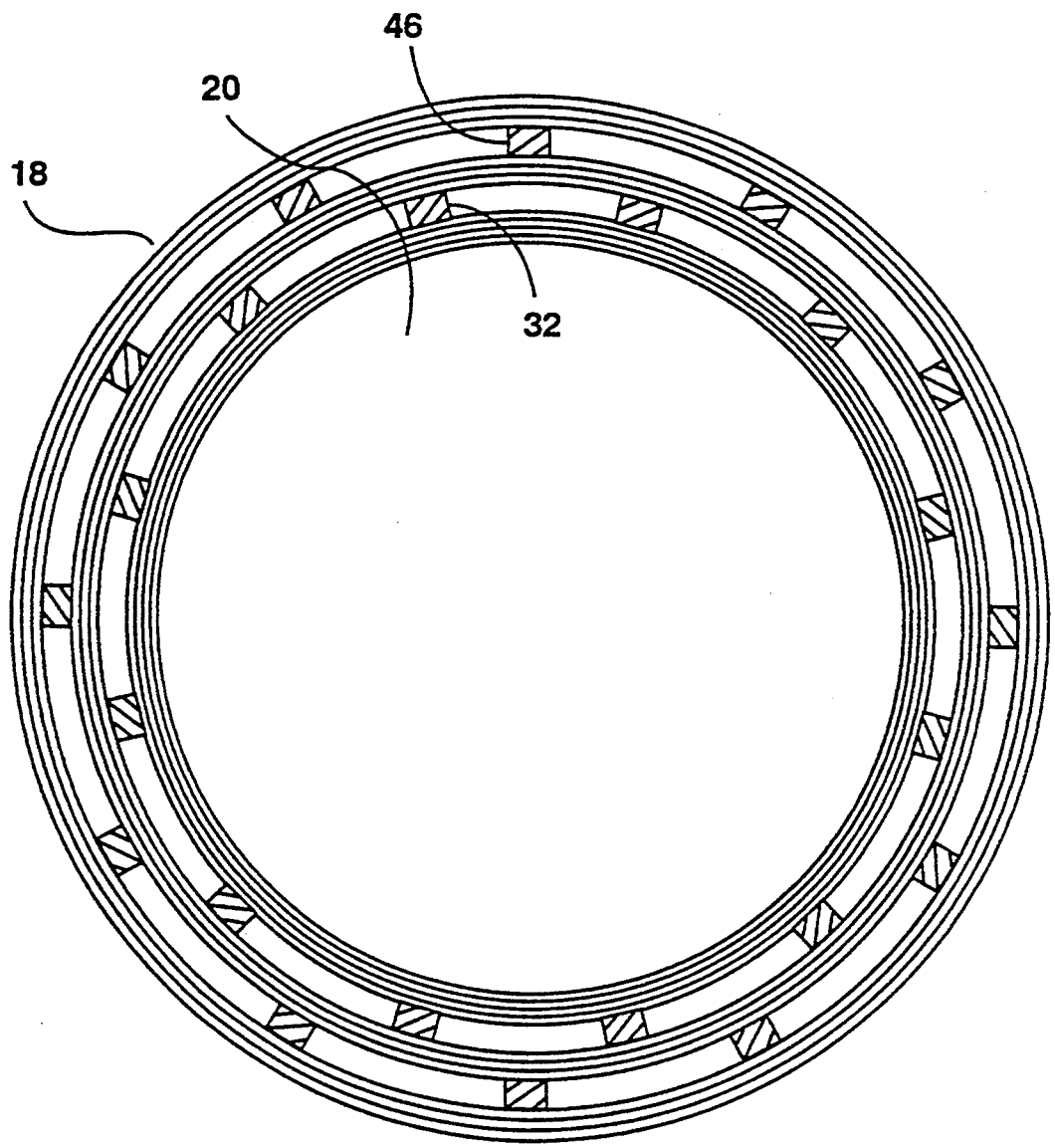
FIG. 9 is a diagrammatic axially transverse sectional view of the double-ribbed composite cylinder of this invention, taken along the plane of line 9—9 in FIG. 8.

Referring to FIG. 6 and FIG. 9, a second set of ribs is wound over the skin, but with their positions displaced relative to the ribs located axially inward thereof. Here a sixth fibrous material is wound circumferentially around the cylindrical shape defined by the outer surface of intermediate skin 36 so as to form a plurality of outer circumferential ribs 38. Outer circumferential ribs 38 are spaced apart longitudinally and staggeringly with respect to inner circumferential ribs 24 and have equiradial outer surfaces defining a cylindrical shape which is coaxial with mandrel 20.

In accordance with a preferred embodiment of the present invention, not only inner circumferential ribs 24 but also outer circumferential ribs 38 are wound by means of using a heated bath to wet wind fibrous material such as fiberglass with high strain-to-failure viscoelastic matrix material such as polyurethane or polyurethane/urea.

Figure 7:
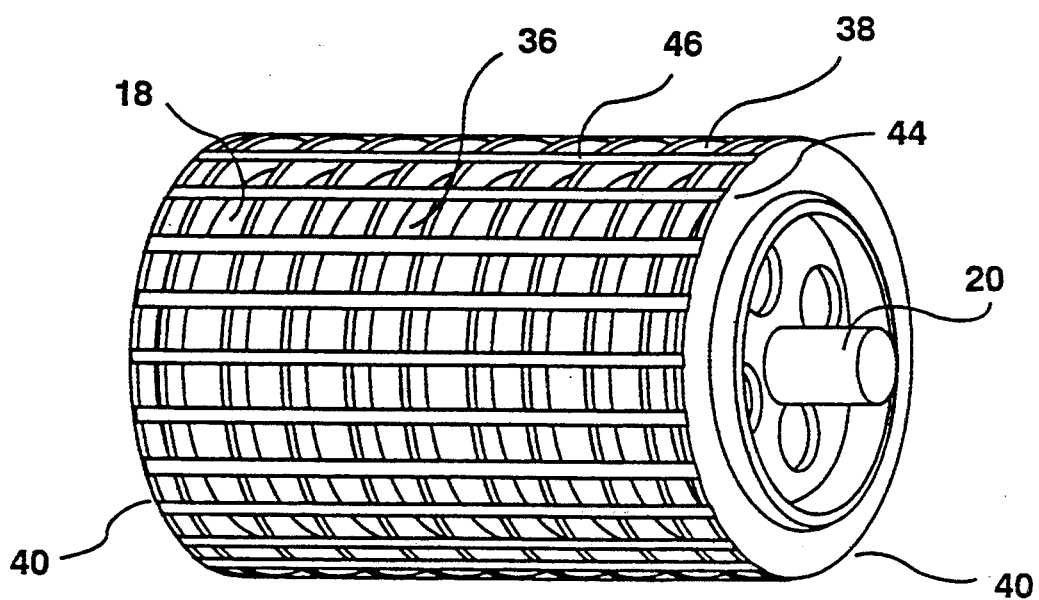

Referring to FIG. 7, two outer pin rings 40 are positioned, one at each axial end of mandrel 20. Each outer pin ring 40 has an outer ring 42 portion and a plurality of outer pins 44 spaced apart circumferentially and projecting radially from outer ring 42, referring again to FIG. 10, which may be viewed as generally representative of the pin ring configuration in accordance with this invention. Each outer ring 42 has an outer surface defining a cylindrical shape which is coaxial with mandrel 20 and approximately equiradial with the cylindrical shape defined by said outer surfaces of outer circumferential ribs 38.

A second set of longitudinal stringers is wound in place with the use of the pin ring assembly, again resulting in a cylinder workpiece 18 structure such as that shown in FIG. 7. Here, a seventh fibrous material is engaged with outer pins 44 and wound longitudinally along the cylindrical shape defined by the outer surfaces of outer circumferential ribs 38 so as to form a plurality of outer longitudinal stringers 46 which are spaced apart circumferentially and correspondingly with outer pins 44 and have equiradial outer surfaces defining a cylindrical shape which is coaxial with mandrel 20.

Reference again being made to FIG. 4, which may be viewed as generally representative of circumferential winding of circumferential bands in accordance with this invention, an eighth fibrous material is wound circumferentially around the cylindrical shape defined by the outer surfaces of outer longitudinal stringers 46 so as to form a pair of outer circumferential bands 48 located longitudinally inward of and adjacent to outer pin rings 40, outer circumferential bands 48 being spaced apart longitudinally and having equiradial outer surfaces defining a cylindrical shape which is coaxial with mandrel 20. Thus, tapes or fibers are again wound in the hoop direction at the ends of cylinder workpiece 18, this time to form outer circumferential bands 48, which provide a net force on outer longitudinal stringers 46 in the radial direction toward the interior of the cylinder.

Figure 8:
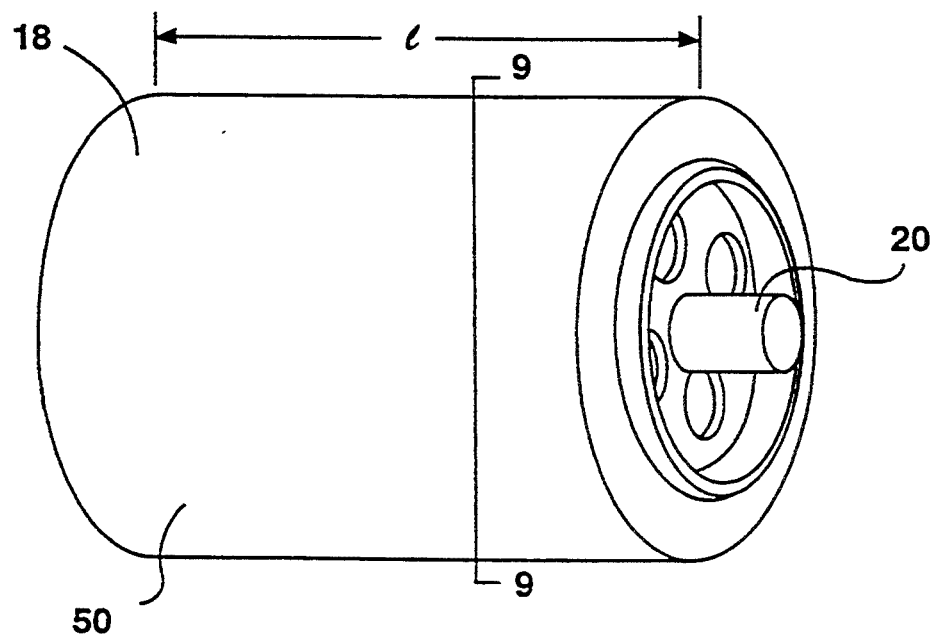

Another continuous skin is wound over top outer longitudinal stringers 46 and outer circumferential bands 48, now referring to FIG. 8, which shows the completion of cylinder workpiece 18 as a double-layered, translated rib-stiffened composite cylinder. Here, a ninth fibrous material is wound circumferentially around the cylindrical shape defined by the outer surfaces of outer longitudinal stringers 46 and outer circumferential bands 48 so as to form outer skin 50 having an outer surface defining a cylindrical shape which is coaxial with mandrel 20.

Accordingly, in this example a translated double rib-stiffened composite cylinder having a hollow core has been fabricated. This composite cylinder comprises: inner skin 22; a plurality of inner circumferential ribs 24 located radially outwardly adjacent to inner skin 22 and spaced apart longitudinally; a pair of inner pin rings 26 located at the axial ends of composite cylinder workpiece 18, one inner pin ring 26 at each axial end, each inner pin ring 26 having an inner ring 28 portion and a plurality of inner pins 30 spaced apart circumferentially and projecting radially from inner ring 28; a plurality of inner longitudinal stringers 32 located radially outwardly adjacent to inner circumferential ribs 24, inner longitudinal stringers 32 engaged with inner pins 30 and spaced apart circumferentially and correspondingly with inner pins 30; a pair of inner circumferential bands 34 located radially outwardly adjacent to inner longitudinal stringers 32 and longitudinally inwardly adjacent to inner pin rings 26; intermediate skin 36 located radially outwardly adjacent to inner circumferential bands 34 and inner longitudinal stringers 32; a plurality of outer circumferential ribs 38 located radially outwardly adjacent to intermediate skin 36, outer circumferential ribs 38 spaced apart longitudinally and staggeringly with respect to inner circumferential ribs 24; a pair of outer pin rings 40 located at the axial ends of composite cylinder workpiece 18, one outer pin ring 40 at each axial end, each outer pin ring 40 having an outer ring 42 portion and a plurality of outer pins 44 spaced apart circumferentially and projecting radially from outer ring 42; a plurality of outer longitudinal stringers 46 located radially outwardly adjacent to outer circumferential ribs 38, outer longitudinal stringers 46 engaged with outer pins 44 and spaced apart circumferentially and correspondingly with outer pins 44 a pair of outer circumferential bands 48 located radially outwardly adjacent to outer longitudinal stringers 46 and longitudinally inwardly adjacent to outer pin rings 40; and outer skin 50 located radially outwardly adjacent to outer circumferential bands 48 and outer longitudinal stringers 46.

In accordance with a preferred embodiment of the present invention, inner circumferential ribs 24 and outer circumferential ribs 38 are wet wound with high strain-to-failure viscoelastic matrix material. The use of the high strain-to-failure viscoelastic matrix for circumferential ribs 24 and 38 in this double-layered embodiment has some notable benefits which are more or less characteristic of all the various embodiments of the present invention.

First of all, fiber-reinforced high-strain-to-failure matrix material is superior to fiber-reinforced conventional matrix material in terms of damping. In this double-layered embodiment circumferential ribs 24 and 38 which have been wound with high strain-to-failure viscoelastic matrix (such as polyurethane or polyurethane/urea) have a significant improvement in mechanical vibration damping in comparison with circumferential ribs 24 and 38 which have been wound with conventional matrix material (such as epoxy). Hence, as the composite cylinder structure is strained, circumferential ribs 24 and 38 are able to dissipate energy because of their high strain-to-failure viscoelastic characteristic.

Secondly, because of their high strain-to-failure and their relatively low mechanical properties, as the fiber-reinforced matrix material is compressively loaded while simultaneously being constrained, its elastic properties can increase by several orders of magnitude. As such, the fiber-reinforced high-strain-to-failure matrix material becomes "more structural" as it is loaded instead of seeing a degradation as is typically experienced by other material systems.

Thirdly, there is no parasitic damping treatment utilized in the structural part. The damping material, i.e., the high strain-to-failure matrix material, is actually part of the composite structural form.

Preliminary tests conducted by the U.S. Navy have demonstrated significant improvement in the damping performance of the double hollow core configuration wherein the circumferential ribs have been wet wound with high strain-to-failure matrix material, vis-a-vis the double hollow core configuration wherein the circumferential ribs have been wound with conventional matrix material. The double hollow core cylinder having glass/polyurethane ribs have demonstrated an increase in the damping loss factor of an order of magnitude compared with the damping loss factor for the double hollow core cylinder having glass/epoxy ribs.

Another demonstrated enhancement of the double hollow core cylinder having glass/polyurethane ribs has been the damage tolerance that is built into the cylinder; this occurs because the inner shell is protected by the flexibility of the ribs and the ability of the ribs to minimize the peak load and increase the area over which the peak load will act.

Additionally, the levels of damping which have been achieved in testing by the double hollow core cylinder having glass/polyurethane ribs exceed those which have been achieved by the double hollow core cylinder having glass/epoxy ribs wherein the latter cylinder has incorporated add-on parasitic damping treatment. According to this invention there is no parasitic damping treatment, advantageously admitting of minimum weight design with no fear of deterioration of damping performance such as often occurs with add-on treatments because of debonding or other degradation.

In accordance with Crane and Bergen U.S. Pat. No. 5,261,616, inner skin 22, inner circumferential ribs 24, inner longitudinal stringers 32, inner circumferential bands 34, intermediate skin 36, outer circumferential ribs 38, outer longitudinal stringers 46, outer circumferential bands 48 and outer skin 50 are wound using conventional filament winding technique. The composite cylinder in the above-described example is a translated double rib-stiffened composite cylinder; however, in accordance with Crane and Bergen U.S. Pat. No. 5,261,616, the composite cylinder can be a translated multiple rib-stiffened composite cylinder having any plural number of ribbed layers. In order to add each succeeding ribbed layer to cylinder workpiece 18, steps pertaining to circumferential winding of ribs, positioning of pin rings, longitudinal winding of longitudinal stringers, circumferential winding of bands, and circumferential winding of a skin, are appropriately repeated in accordance with Crane and Bergen U.S. Pat. No. 5,261,616.

In accordance with the present invention, one or more of any of the winding steps—i.e, any step pertaining to circumferential winding of ribs, longitudinal winding of longitudinal stringers, circumferential winding of bands or circumferential winding of a skin—can include wet winding with high strain-to-failure viscoelastic material. Also in accordance with the present invention, at least one portion of the composite hollow cylinder assembly is fiber-reinforced high-strain-to-failure matrix material.

One such fiber-reinforced high-strain-to-failure matrix material portion of the composite hollow cylinder assembly according to this invention can be, e.g.: one or more bands or one or more pairs of bands or one or more portions of one or more bands; one or more skins or one or more portions of one or more skins; one or more stringers or one or more sets of stringers or one or more portions of one or more stringers; one or more ribs or one or more sets of ribs or one or more portions of one or more ribs, etc. Thus many embodiments of the composite hollow cylinder assembly according to this invention may be viewed as preferentially or selectively infiltrated with high-strain-to-failure matrix material.

For some embodiments of the present invention it may be desirable to utilize wet winding with high-strain-to-failure matrix material for one or more entire sections of the cylinder assembly at one or more locations along the longitudinal axis of the cylinder assembly. For some embodiments, it may be desirable to utilize wet winding with high-strain-to-failure matrix material for one or more entire layers of the cylinder assembly. For some embodiments, it may be desirable to utilize wet winding with high-strain-to-failure matrix material for one or more entire layers one or more entire sections of the cylinder assembly at one or more locations along the longitudinal axis of the cylinder assembly.

In the above-described example of a double configuration according to this invention, both sets of ribs (i.e., both inner circumferential ribs 24 and outer circumferential ribs 38) are fiber-reinforced high-strain-to-failure matrix material. The U.S. Navy tested the double configuration comparing one set of ribs being fiber-reinforced high-strain-to-failure matrix material versus both sets of ribs being fiber-reinforced high-strain-to-failure matrix material. The U.S. Navy found no appreciable difference in terms of damping between the two approaches. Therefore, since utilization of fiber-reinforced high-strain-to-failure matrix material entails more flexibility and hence less structural rigidity, for many embodiments of the present invention wherein less structural rigidity is desired it appears that utilization of one set of fiber-reinforced high-strain-to-failure matrix material ribs in the double configuration may be preferable.

In fact, for many embodiments of multiple-layered configurations of the present invention, in general the tendency of the fiber-reinforced high-strain-to-failure matrix material toward greater flexibility and lesser rigidity can be balanced against concomitant improved damping in evaluating the particular embodiment in terms of achieving desired characteristics.

As a practical matter, for most embodiments of the present invention utilization of high-strain-to-failure matrix material for bands or stringers or the outermost skin would appear to have negligible beneficial effect in terms of damping or otherwise. Utilization of high-strain-to-failure matrix material for a skin which is not the outermost skin can have a damping effect for some embodiments. Utilization of high-strain-to-failure matrix material for the outermost skin can advantageously make the composite structure more resiliant for impact purposes.

Many embodiments of the present invention may be viewed as hybrid composite axis-of-symmetry forms having one fiber system and two matrix systems. For example, utilization in the above-described example of one fiber system along with fiber-reinforced high-strain-to-failure matrix material circumferential ribs yields a composite cylinder structure which is a hybrid of resins instead of a hybrid of fiber systems; this hybrid of resins has highly nonlinear material properties which improve instead of decay with increasing loading. This mode of hybridity in a composite structure differs markedly from the conventional notion of hybridity in a composite structure, viz., a hybrid composite structural form comprising one matrix system and two or more fiber systems.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A rib-stiffened composite cylinder having a hollow core, said composite cylinder comprising:
   an inner skin;
   a first ribbed layer, said first ribbed layer including:
   a plurality of first circumferential ribs located radially outwardly adjacent to said inner skin and spaced apart longitudinally;
   a pair of first pin rings located at the axial ends of said composite cylinder, one said inner pin ring at each axial end, each said inner pin ring having a ring portion and a plurality of pins spaced apart circumferentially and projecting radially from said ring portion;
   a plurality of first longitudinal stringers located radially outwardly adjacent to said inner circumferential ribs, said inner longitudinal stringers engaged with said pins of said inner pin rings and spaced apart circumferentially and correspondingly with said pins of said inner pin rings;
   a pair of first bands located radially outwardly adjacent to said inner longitudinal stringers and longitudinally inwardly adjacent to said first pin rings;
   a first outer skin located radially outwardly adjacent to said inner bands and said inner longitudinal stringers;
   at least a second ribbed layer, said second ribbed layer including:
   a plurality of second circumferential ribs located radially outwardly adjacent to said first outer skin, said outer circumferential ribs spaced apart longitudinally and staggeringly with respect to said inner circumferential ribs;
   a pair of second pin rings located at the axial ends of said composite cylinder, one said outer pin ring at each axial end, each said outer pin ring having a ring portion and a plurality of pins spaced apart circumferentially and projecting radially from said ring portion;
   a plurality of second longitudinal stringers located radially outwardly adjacent to said inner circumferential ribs, said inner longitudinal stringers engaged with said pins of said inner pin rings and spaced apart circumferentially and correspondingly with said pins of said inner pin rings;
   a pair of second bands located radially outwardly adjacent to said inner longitudinal stringers and longitudinally inwardly adjacent to said first pin rings;
   a second outer skin located radially outwardly adjacent to said inner bands and said inner longitudinal stringers;
   each succeeding said ribbed layer being radially outward of the previous said ribbed layer, said previous outer said layer including previous said circumferential ribs, previous said pin rings, previous said longitudinal stringers, previous said bands, and previous said outer skin, said succeeding said ribbed layer including succeeding said circumferential ribs, succeeding said pin rings, succeeding said longitudinal stringers, succeeding said bands, and succeeding said outer skin, said succeeding said circumferential ribs spaced apart longitudinally and staggeringly with respect to said previous said circumferential ribs;

at least one portion of said cylinder being fiber-reinforced high-strain-to-failure viscoelastic matrix material.

2. A composite cylinder as in claim 1, wherein at least a portion of at least one said circumferential rib is fiber-reinforced high-strain-to-failure viscoelastic matrix material.

3. A composite cylinder as in claim 1, wherein at least a portion of at least one said skin is fiber-reinforced high-strain-to-failure viscoelastic matrix material.

4. A composite cylinder as in claim 1, wherein said high strain-to-failure viscoelastic matrix material is a material selected from the group consisting of polyurethane and polyurethane/urea.

5. A multiple-layered, translatedly rib-stiffened composite cylinder having a hollow core, said composite cylinder comprising:

an inner layer which includes an inner skin; and at least one outer layer, each said outer layer including a plurality of circumferential ribs, a pair of pin rings, a plurality of longitudinal stringers, a pair of bands, and an outer skin;

said composite cylinder being produced by the method comprising the following steps:

(a) winding circumferentially an inner skin around said cylindrical mandrel;

said step (a) forming the inner said layer of said composite cylinder;

(b) winding circumferentially a plurality of first circumferential ribs around said inner skin, said first circumferential ribs spaced apart longitudinally;

(c) positioning a pair of first pin rings at the axial ends of said cylindrical mandrel, one said first pin ring at each axial end, each said first pin ring having a ring portion and a plurality of pins spaced apart circumferentially and projecting radially from said ring portion;

(d) winding longitudinally a plurality of first longitudinal stringers, said first longitudinal stringers transversely superposed on and contiguous with said first circumferential ribs, said first longitudinal stringers engaged with said pins of said first pin ring and spaced apart circumferentially and correspondingly with said pins of said first pin ring;

(e) winding circumferentially a pair of first bands, said first bands located longitudinally inward of and adjacent to said first pin rings;

(f) winding circumferentially a first outer skin around said first bands and said first axial stringers;

said steps (b) to (f) inclusive forming the first outer said layer of said composite cylinder, said first outer said layer including said first circumferential ribs, said first pin rings, said first longitudinal stringers, said first bands, and said first outer skin; and (g) repeating steps (b) to (f) inclusive at least once, each said repetition of steps (b) to (f) inclusive forming a next outer said layer of said composite cylinder, each said next outer said layer being radially outward of the previous outer said layer, said previous outer said layer being the radially outermost said outer said layer prior to said repetition of steps (b) to (f) inclusive, said previous outer said layer including previous said circumferential ribs, previous said pin rings, previous said longitudinal stringers, previous said bands, and previous said outer skin, said next outer said layer including next said circumferential ribs, next said pin rings, next said longitudinal stringers, next said bands, and next said outer skin, said next said circumferential ribs spaced apart longitudinally and staggeringly with respect to said previous said circumferential ribs;

at least one said winding step including wet winding with high-strain-to-failure viscoelastic matrix material.

6. A composite cylinder as in claim 5, wherein at least one said winding step includes wet winding at least a portion of at least one said circumferential rib with high-strain-to-failure viscoelastic matrix material.

7. A composite cylinder as in claim 5, wherein at least one said winding step includes wet winding at least a portion of at least one said skin with high-strain-to-failure viscoelastic matrix material.

8. A composite cylinder as in claim 5, wherein at least one portion of said cylinder is fiber-reinforced high-strain-to-failure viscoelastic matrix material.

9. A composite cylinder as in claim 5, wherein at least a portion of at least one said circumferential rib is fiber-reinforced high-strain-to-failure viscoelastic matrix material.

10. A composite cylinder as in claim 5, wherein at least a portion of at least one said skin is fiber-reinforced high-strain-to-failure viscoelastic matrix material.

11. A composite cylinder as in claim 5, wherein said high strain-to-failure viscoelastic matrix material is a material selected from the group consisting of polyurethane and polyurethane/urea.

* * * * *